United States Patent Office 3,381,905
Patented May 7, 1968

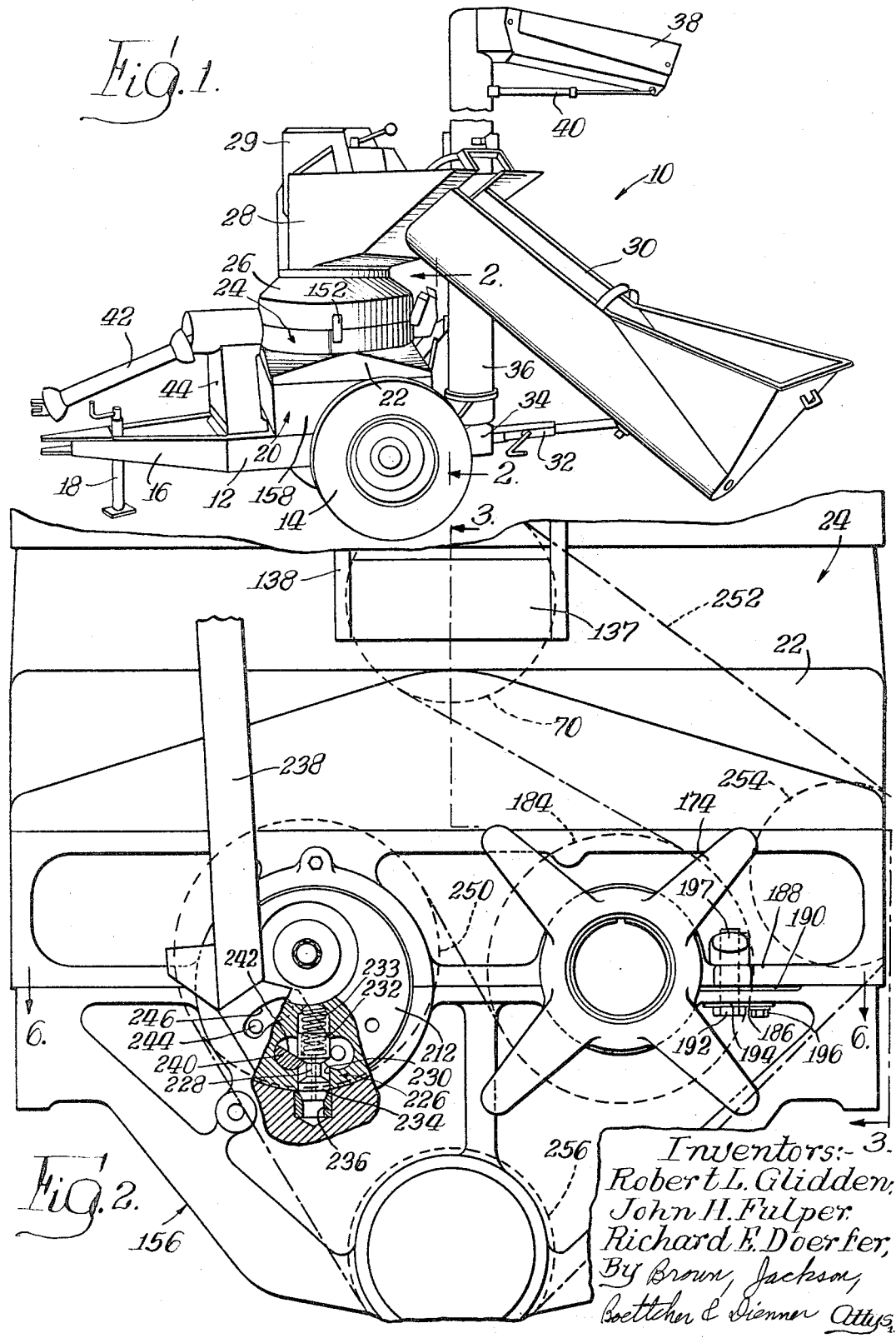

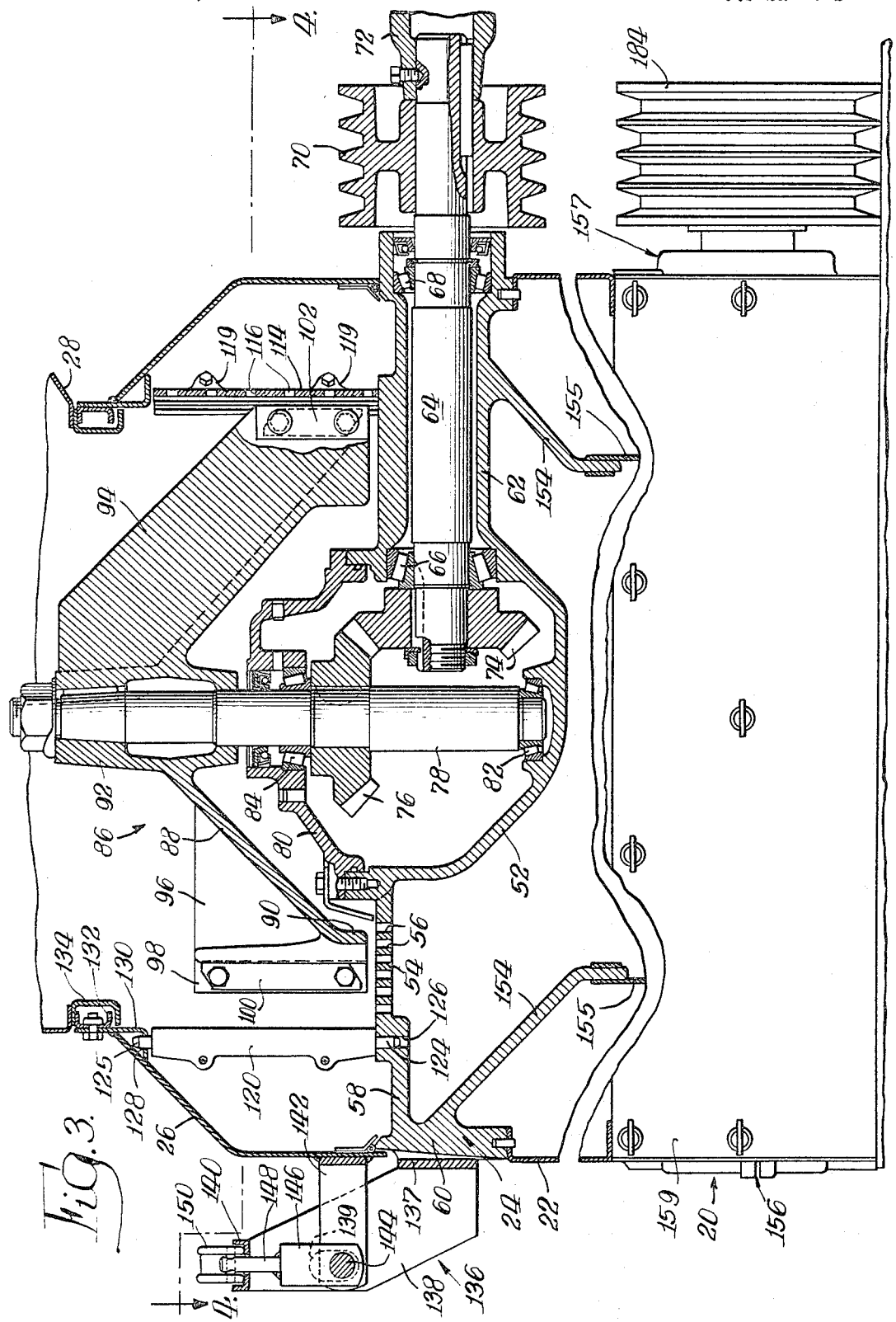

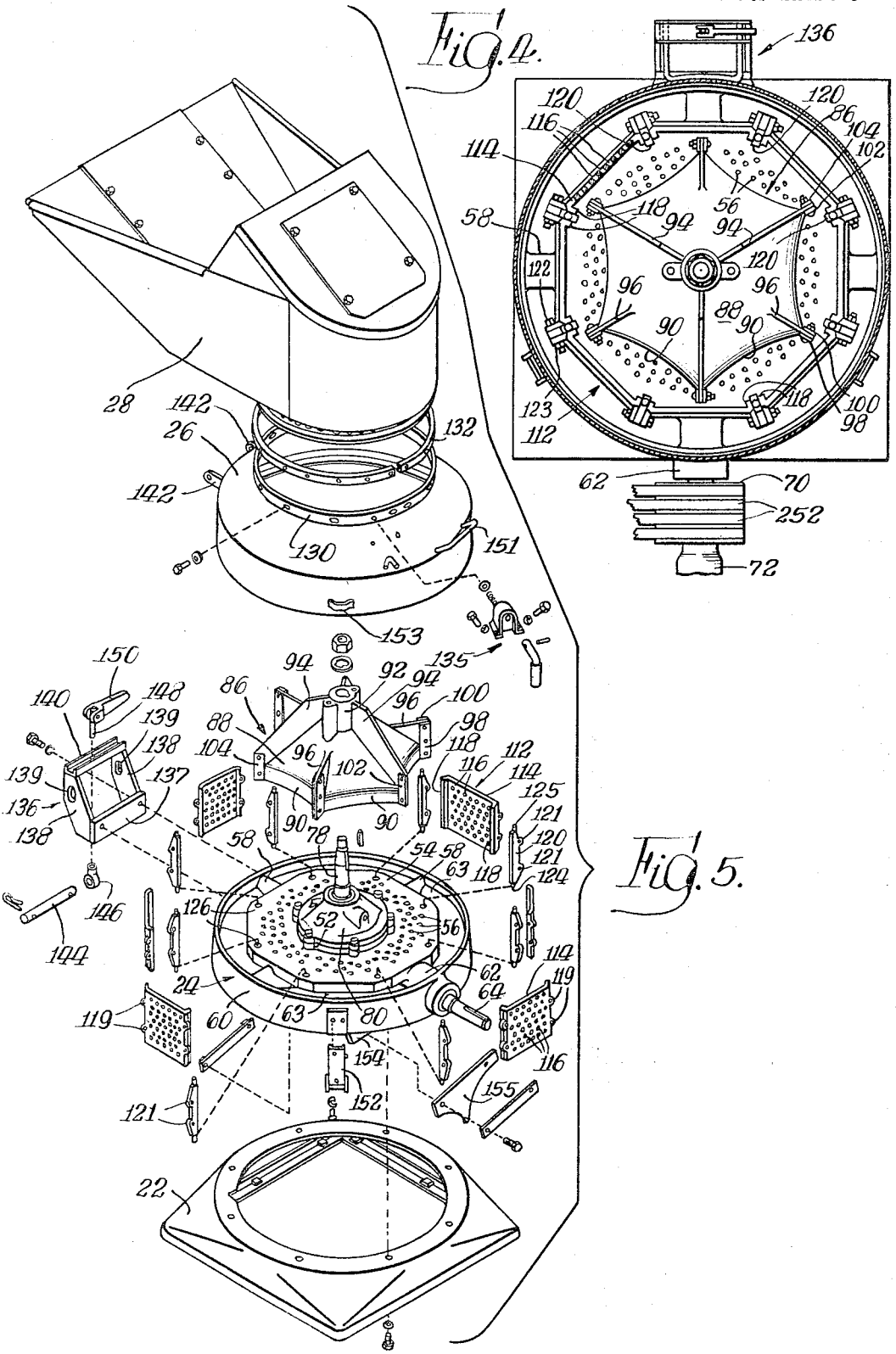

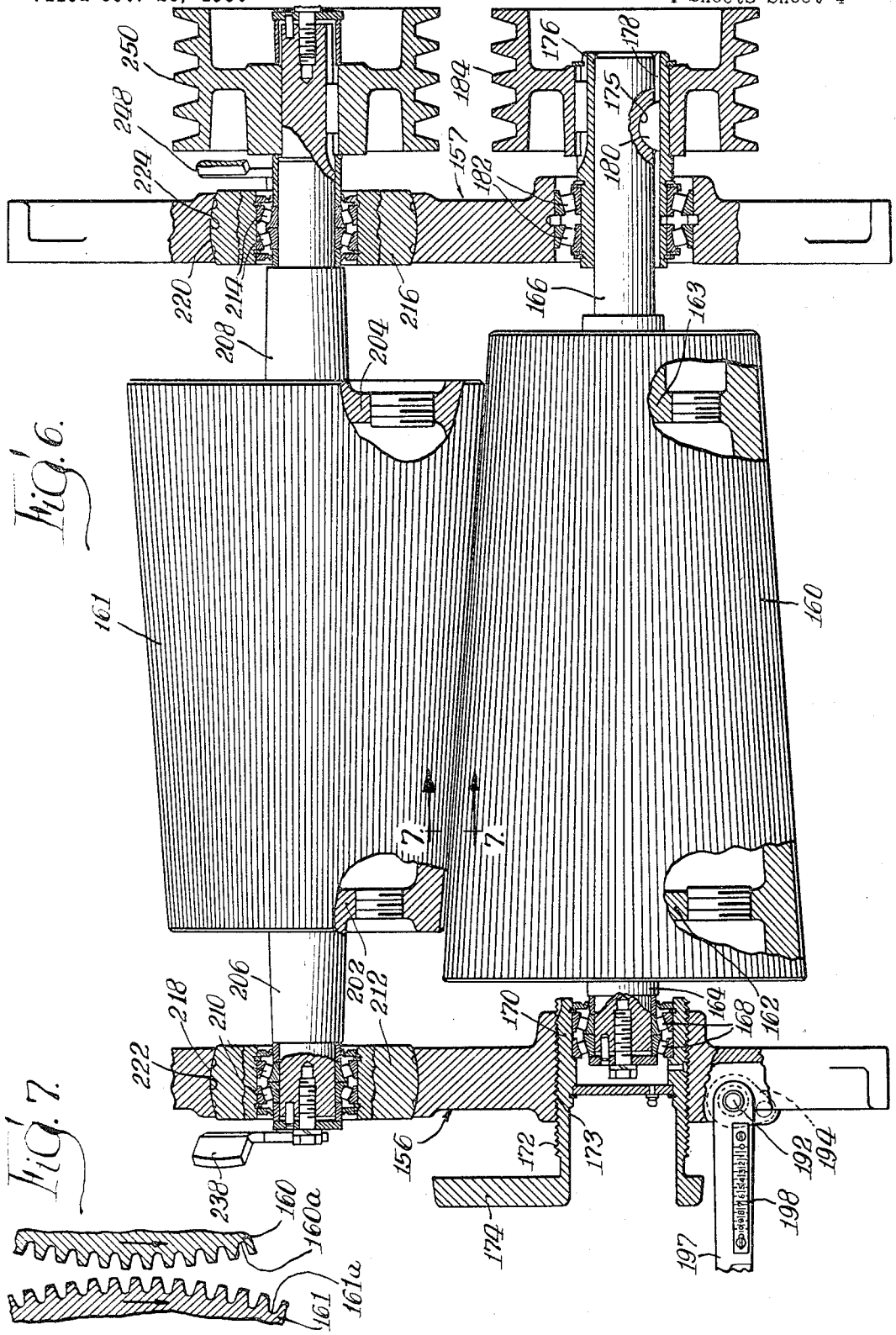

3,381,905
PROCESSING APPARATUS
Robert L. Glidden and John H. Fulper, Kewanee, Ill., and Richard E. Doerfer, Cedar Falls, Iowa, assignors to Kewanee Machinery & Conveyor Company, Kewanee, Ill., a corporation of Illinois
Filed Oct. 26, 1964, Ser. No. 406,429
11 Claims. (Cl. 241—152)

Our present invention relates generally to apparatus for processing grain material, such as ears of corn, into feed, and more particularly to apparatus for first chopping or breaking ears of corn into fragments and then further processing the fragments, by milling or the like, into final particle size.

It is an object of our present invention to provide a corn chopper assembly comprising rotatable impeller means, perforated enclosure or screen means extending about the full circumference of the impeller means, and associated shearing means, whereby ears of corn may be broken up into fragments and discharged through the perforated enclosure means throughout the 360 degree extent of the impeller and enclosure means.

It is another object of our present invention to provide a corn chopper assembly, as described, wherein the impeller means is rotatable about a vertical axis and the perforated enclosure means is vertically disposed thereabout, whereby the processing action, which is aided by gravity and centrifugal force, is substantially equalized throughout the 360 degree extent of the impeller means and perforated enclosure means.

It is another object of our present invention to provide a corn chopper assembly, as described, which is adapted to be mounted vertically above a roller mill assembly so that corn fragments discharged by the corn chopper drop by gravity and are thus fed directly into the roller mill wheer the fragments are further processed.

It is another object of our present invention to provide a corn chopper assembly wherein the impeller is of concave pyramidal shape so as to provide a pulsing action during the processing operation to improve efficiency.

It is another object of our present invention to provide a corn chopper assembly wherein the impeller has a plurality of radial vanes with alternate vanes having portions projecting vertically above the other vanes, which alternate vanes upon rotation of the impeller serve to fracture material fed thereto into initial pieces to assist subsequent fragmentation.

It is a further object of our present invention to provide a corn chopper assembly, as described, wherein vertical cutter means are arranged at the outer ends of the impeller vanes and a plurality of stationary vertical cutter means are arranged about the perforated enclosure means, with the number of stationary cutter means differing from the number of the cutter means at the ends of the vanes so that not all pairs of cutter means are simultaneously cutting or shearing material. Thus, the power requirements of the corn chopper assembly are maintained at a minimum and more nearly uniform.

It is a further object of our present invention to provide a corn chopper assembly, as described, wherein the perforated wall means or screen is of polygonal configuration with the stationary cutter means projecting radially inwardly at each of the corners thereof. By reason of this arrangement, the cutter means at the ends of the impeller vanes are permitted to come close to the stationary cutter means and to the screen itself betwen adjacent cutter means. However, the space provided adjacent the sides of the stationary cutter means serves to accommodate the flow of material being fragmentized at the shearing or cutting means whereby to facilitate discharge of the fragments through the screen and thereby increase the discharge capacity over conventional round screen constructions and minimize power requirements.

It is a further object of our present invention to provide a corn chopper assembly, as described, wherein the screen is of regular polygonal configuration so that it may be rotated angularly from one operative position to another, whereby to permit equalization of wear at the various locations about the screen and cutter means.

It is a further object of our present invention to provide a corn chopper assembly, as described, which is retained in operative position between a horizontal supporting plate and a generally annular corn head shroud, without the use of any bolts or other usual fastening elements.

It is a still further object of our present invention to provide a corn chopper assembly, as described, wherein the screen serves as a structural support for apparatus mounted on top of the corn head shroud.

It is a still further object of our present invention to provide a corn chopper assembly, as described, wherein the construction of the screen is such that it may be inverted to utilize both sides of the screen cutter means and the screen perforations.

Still another object of our present invention is to provide a corn chopper assembly, as described, wherein the corn head shroud, and any hopper thereon, may be tilted or pivoted away from the corn chopper assembly so that access may be had to the latter.

Now in order to acquaint those skilled in the art with the manner of constructing and using apparatus in accordance with the principles of our present invention we shall describe in connection with the accompanying drawings a preferred embodiment of our invention.

In the drawings:

FIGURE 1 is a perspective view of a mobile corn chopper and roller mill unit incorporating the principles of our present invention;

FIGURE 2 is an enlarged fragmentary elevational view, with portions being broken away and shown in section, of the mobile unit of FIGURE 1, taken substantially along the line 2—2 in FIGURE 1, looking in the direction indicated by the arrows;

FIGURE 3 is a vertical view, partly in section and partly in elevation, of the corn chopper assembly of our present invention, taken substantially along the line 3—3 in FIGURE 2, looking in the direction indicated by the arrows;

FIGURE 4 is a horizontal sectional view, on a reduced scale, of the corn chopper assembly of our present invention, taken substantially along the line 4—4 in FIGURE 3, looking in the direction indicated by the arrows;

FIGURE 5 is an exploded perspective view of the corn chopper assembly and related parts shown in FIGURES 3 and 4;

FIGURE 6 is a horizontal sectional view of the roller mill assembly located below the corn chopper assembly, taken substantially along the line 6—6 in FIGURE 2, looking in the direction indicated by the arrows; and FIGURE 7 is an enlarged fragmentary sectional view, taken substantially along the line 7—7 in FIGURE 6, looking in the direction indicated by the arrows.

Referring now to FIGURE 1, there is indicated generally by the reference numeral 10 a mobile corn chopper and roller mill unit incorporating the principles of our present invention. The mobile unit 10 comprises a chassis or main frame 12 which is supported on an axle and wheel assembly 14. The frame 12 is provided at one end with a triangular extension 16 that serves as a hitch for pivotal attachment to the rear end of a tractor or the like, or to channel rails for a stationary installation. Secured to the triangular extension 16 is a generally vertically extending jack 18 which has a lower end engageable with the ground and which is manually operable for levelling the mill 10. Supported on the main frame 12 in superposed relation are a roller mill housing 20, a roller mill shroud 22, a corn chopper gear housing assembly 24, a generally annular corn chopper shroud 26, a hopper 28 and a feeder auger transmission housing 29. Extending generally angularly downwardly from the hopper 28 is a feeder auger housing 30 having a feeder auger (not shown) mounted therein. The height of the lower end of the feeder auger housing 30 is adapted to be adjusted by means of an extensible jack assembly 32 which, at its one end, is pivotally connected to the housing 30 and, at its other end, is adapted to bear against the main frame 12. Extending longitudinally of the main frame 12 immediately beneath the roller mill housing 20 is a horizontal auger housing 34 which serves to support at one end a generally vertical auger housing 36 provides at its upper end with a lateral gravity discharge spout 38. Suitable augers (not shown) are mounted within the auger housings 34 and 36 for conveying milled grain from the bottom of the roller mill housing 20 to an elevated point of discharge. The generally vertical auger housing 36 is arranged to be selectively tilted 25 degrees to either side. Gravity discharge spout 38 can be rotated through 360 degrees and the downward angular position thereof is adapted to be adjusted by means of an extensible tie rod 40. The corn chopper and roller mill assemblies, which will be described in detail hereinafter, are adapted to be driven from the power takeoff shaft of a tractor through suitable power transmission means including a main drive shaft 42 and sheave and belt means enclosed within a cover 44.

Referring now to FIGURES 3, 4 and 5, we shall describe the details of construction of the corn chopper assembly of our present invention, which includes the gear housing assembly 24, and which is arranged, in part, within the shroud 26. The gear housing assembly 24 is comprised of a central casing portion 52, a horizontal supporting plate or disc portion 54 thereabout having a plurality of apertures or openings 56 extending therethrough, a plurality of circumferentially spaced radial web segments 58, an outer annular rim portion 60, and a tubular sleeve portion 62 extending radially from the casing portion 52 and through the rim portion 60. This construction serves to define a plurality of generally arcuate grain passageway areas 63. A horizontal impeller drive shaft 64 is rotatably mounted by means of roller bearing assemblies 66 and 68 within the tubular sleeve portion 62. The end of the drive shaft 64 that projects outwardly of the tubular sleeve 62 has mounted thereon both a sheave 70 and the one end 72 of a universal joint (not shown) having suitable driving connection with the main drive shaft 42 shown in FIGURE 1. The end of the impeller drive shaft 64 that projects into the casing 52 has secured thereon a bevel gear 74 which has meshing engagement with a bevel gear 76 secured on a vertical impeller drive shaft 78. The casing 52 is enclosed by a cover member 80 and the drive shaft 78 is rotatably mounted by means of roller bearing assemblies 82 and 84 in the casing 52 and the casing cover 80. The feeder auger within the housing 30 is adapted to be drivingly connected with the impeller drive shaft 78 through transmission gearing within the housing 29.

Mounted for rotation with the vertical drive shaft 78 is an impeller indicated generally by the reference numeral 86. The impeller 86 includes a hollow pyramidal body portion 88 with lower scalloped or concave apron portions 90, and an upper hub portion 92 suitably secured to the upper end of the drive shaft 78. The impeller 86 further includes vertical radially extending circumferentially spaced sets of vane members 94 and 96. The set of vane members 94, which preferably number three, extend from the hub portion 92 downwardly along the impeller body 88 and terminate at the outer periphery thereof, while the set of vane members 96, which are alternately arranged with respect to the vane members 94, project outwardly of the impeller body 88 and terminate at the periphery thereof. The vertical extent of the terminal edges of the vane members 96 is greater than the vertical extent of the terminal edges of the vane members 94. Removably secured to each of the terminal edges of the vane members 96, as by screws, is a vertical cutter bar 98 and a cooperating vertical lock plate 100. Removably secured to each of the terminal edges of the vane members 94, as by means of screws, is a vertical cutter bar 102 and a cooperating vertical lock plate 104. The cutter bars 98 and lock plates 100 have a greater vertical extent than the cutter bars 102 and lock plates 104. Because the cutter bars 98 and 102 are detachable, they may be reversed and inverted to permit all four cutting edges thereof to be used prior to sharpening or replacement. Certain details of the impeller construction are claimed in the copending application of Robert L. Glidden, Ser. No. 406,431, filed Oct. 26, 1964.

Surrounding the impeller 86 is an octagonal sizing screen assembly 112 which is comprised of vertical wall sections 114 with a plurality of openings or perforations 116 formed therethrough. The sides of the wall sections 114 are formed with radially inwardly directed flange portions 118 and radially outwardly directed lug portions 119. Interposed alternately with the wall sections 114 are vertical cutter bars 120. Each of the cutter bars 120 has sides seating against the flange portions 118 of adjacent wall sections 114 and forward vertical cutting edges disposed radially inwardly beyond the ends of the flange portions 118. Each of the cutter bars 120 also has rearwardly extending lugs 121 that are secured by bolt and nut assemblies 122–123 between the lugs 119 of adjacent wall sections 114. Still further, the opposite ends of the cutter bars 120 are provided with vertical pin members 124 and 125. When the wall sections 114 and cutter bars 120 are secured in assembled relation, the resultant screen assembly 112 is adapted to be located and maintained in position between the supporting plate 54 and the shroud 26. In one vertical position of the screen assembly 112, the pin members 124 are adapted to be received in openings or apertures 126 formed in the plate portion 54 of the gear housing assembly 24, and the pin members 125 are adapted to be received in openings or apertures 128 formed in the horizontal flange portion of an annular collar member 130 secured to the shroud 26 at the upper end thereof. The screen assembly 112 may be inverted from the position shown in which case the pin members 125 are received in the plate openings 126 while the pin members 124 are received in the shroud openings 128. By permitting inversion of the screen assembly 112, both cutting edges of each of the cutter bars 120 and both sides of each of the screen perforations 116 may be utilized in the processing operation. Because of the described mounting of the screen assembly 112, the screen assembly may be initially positioned, repositioned, removed or inverted, without the use of hand tools.

The screen assembly 112 also serves as a structural support for apparatus mounted on top of the corn head shroud 26. The screen assembly 112 is of regular polygonal configuration so that it may be rotated angularly from one operative position to another, whereby to permit equalization of wear at various locations about the assembly. The screen walls 114 and cutter bars 120 are fabricated as independent parts to minimize manufacturing costs and to facilitate replaceability. Certain details of the screen construction are claimed in the copending application of Robert L. Glidden, Ser. No. 406,431, filed Oct. 26, 1964. Since the screen assembly 112 extends about the full circumference of the impeller 86, and since both the screen assembly 112 and the impeller 86 are vertically disposed, ears of corn may be broken up into fragments and discharged through the screen perforations 116 throughout the 360 degree extent of the corn chopper assembly, with the processing action being substantially equalized thereabout. The cutter bars 98 and 102 wedge grain fragments against the inner flat surfaces of the octagonal screen as the cutter bars pass thereby thus increasing the discharge capacity of this screen over conventional round screens. As will be observed from FIGURES 4 and 5, the number of screen cutters 120 is different than the number of impeller cutters 98 and 102 so that not all pairs of cutters are simultaneously cutting or shearing material, thereby minimizing the power requirements of the corn chopper assembly.

The hopper 28, which is vertically above the corn chopper assembly, is mounted on the shroud 26 for rotation through 360 degrees relative thereto. In this connection, an annular C-shaped inwardly facing channel ring 132 is secured, as by bolts, to the inboard side of the collar member 130 adjacent the upper end thereof. The channel ring 132 serves to support an annular C-shaped outwardly facing channel ring 134 the upper flange portion of which is secured to the lower wall portion of the hopper 28. The channel ring 134 is rotatably slidable relative to the channel ring 132 whereby to accommodate rotation of the hopper 28 relative to the shroud 26. The hopper 28 may be locked in any rotative position by means of latch mechanism indicated generally at 135 in FIGURE 5. To permit access to be had to the impeller 86 and the screen assembly 112, the shroud 26 and hopper 28 are adapted to be tilted or swing upwardly and away from their normal position shown in FIGURES 1 and 3. For this purpose, a floating pivotal mounting is provided between the shroud 26 and the gear housing assembly 24. This mounting comprises a bracket assembly 136 including a transverse bar 137 secured to the side of the gear housing assembly 24, a pair of laterally spaced side wall members 138 having vertically elongated slots 139 formed therethrough, and a transverse upwardly facing C-shaped channel member 140. Secured to the side of the corn chopper shroud 26 are a pair of parallel strap members 142 the outer ends of which are received within the bracket assembly 136. Extending through the strap members 142 is a transverse hinge rod 144 the ends of which are received in the vertical slots 140. The hinge rod 144, intermediate of its ends, is secured within a collar member 146 having an extension pin portion 148 that projects through the bight portion of the bracket channel 140. The upper end of the pin 148 is pivotally mounted in the bifurcated cam end of a pivot handle 150. The high point of the cam end of the handle 150 is arranged so that, as the handle 150 is pivoted upwardly from a horizontal to a vertical position, the pin 148 is drawn vertically upwardly. Such movement of the pin 148 serves to slightly raise the shroud 26 at the floating pivotal mounting thereof whereupon the adjacent openings 128 in the shroud collar 130 are withdrawn from the pin members 125 thereby permitting the shroud 26 to be pivoted about the hinge rod 144 away from the corn chopper assembly.

A handle 151 is secured to the shroud 26 at the side opposite the floating pivotal mounting thereof, and suitable latch mechanisms 152 may be arranged about the gear housing assembly 24 for engaging catches 153 on the shroud 26 whereby to maintain the latter in closed position. When the shroud 26 is pivoted away from the corn chopper assembly, the screen assembly 112 may be removed either for maintenance or for replacement by another screen assembly having smaller or larger perforations.

Arranged immediately beneath the corn chopper assembly within the housing 20 is a roller mill assembly. To direct fragmented corn from the corn chopper assembly to the roller mill assembly, the gear housing assembly 24, as shown in FIGURE 3, is formed with downwardly inclined wall sections 154 from which depend spaced baffles or shields 155 that extend into the housing 20. The roller mill housing 20 is comprised of two-part rear and front walls 156 and 157 (FIGURES 2 and 6), and side walls 158 (FIGURE 1) and 159 (FIGURE 3).

Mounted within the housing 20, as best shown in FIGURE 6, are a pair of truncated conical or tapered rollers 160 and 161 having longitudinal grooves 160a and 161a (FIGURE 7) formed in their outer peripheries. The roller 160 is a generally hollow cone having apertured radial walls 162 and 163 from which extend opposed axial stub shafts or journal ends 164 and 166. The stub shaft 164 is secured within the inner races of a pair of roller bearing assemblies 168, the outer races of which are secured within the inner end of a sleeve or support member 170. The sleeve member 170 is provided with exterior threads 172 that are threadingly received within a threaded opening 173 formed in the rear housing wall 156. A cross handle 174 with radial spokes is provided at the outer end of the sleeve member 170. The opposite stub shaft 166 of the roller 160, which is provided with a key slot 175, is received in a sleeve member 176 having an internal axial keyway 178 therein. A Woodruff key 180 is seated in the key slot 175 and projects radially into the keyway 178 whereby to cause the stub shaft 166 to rotate with the sleeve member 176 and yet permit axial movement of the stub shaft 166 relative to the sleeve member 176. The inner end of the sleeve member 176 is rotatably mounted by means of a pair of roller bearing assemblies 182 in the front housing wall 157. Secured on the outer end of the sleeve member 176 is a sheave 184.

Upon rotation of the cross handle 174 in one direction or the other, the sleeve member 170 is threaded inwardly or outwardly of the housing opening 173 whereby the roller 160 is caused to be moved axially within the roller mill housing 20 and relative to the adjacent roller 161. As shown in FIGURES 2 and 6, suitable means are provided for locking the sleeve member 170 in any predetermined rotative position. In this connection, the rear housing wall 156 has rib portions 186 and 188 at the parting line thereof and formed along the upper surface of the lower rib portion 186 is a narrow recess 190. The recess 190, which is bounded by the two generally parallel wall portions of the ribs 186 and 188, interrupts the threads of the threaded opening 173. Projecting upwardly through the ribs 186 and 188 and the recess 190 is a cap screw 192 the head of which is received within and held against rotation by a lockplate 194 secured to the rib 186 by a screw 196. Threaded onto the upper end of the cap screw 192 is the one end of a generally horizontal lever 197. The lever 197 is so positioned on the cap screw 192 that when it is swung to the rearwardly projecting position shown in FIGURE 6, the ribs 186 and 188 are urged toward each other whereby to foreshorten the circumference of the threaded opening 173 for clamping the sleeve member 170 therein. Also, when the lever 197 is in this rearwardly projecting position it lies intermediate of two of the spokes of the cross handle 174 thereby limiting accidental rotation of the latter. Still further, the lever 197 is provided with an adjustable linear graduated or calibrated scale 198 with which the inner face of the cross handle 174 may be visually aligned to indicate the axial position of the handle 174 and the roller 160. By reason of this arrangement, any desired axial setting of the roller 160 may be accurately duplicated even though other axial settings have been made in the meantime.

The roller 161 is provided with apertured radial walls 202 and 204 from which extend opposed axial stub shafts or journal ends 206 and 208. The stub shaft 206 is rotatably mounted, by means of a pair of roller bearing assemblies 210, in a bearing block 212, and the stub shaft 208 is similarly rotatably mounted, by means of a pair of roller bearing assemblies 214, in a bearing block 216. The bearing blocks 212 and 216 are respectively formed with spherical surfaces 218 and 220 which are received in spherical seats 222 and 224 in the rear and front housing walls 156 and 157. The axis of rotation of the stub shafts 206 and 208 is spaced from the rotative axis of the bearing blocks 212 and 216. This eccentric mounting of the roller 161, together with the provision of the spherical bearing blocks 212 and 216, permits either or both ends of the roller 161 to be moved away from the roller 160.

As shown in FIGURE 2, detent means 226 is provided for maintaining the roller 161 in normal operating position shown in FIGURES 2 and 6. The detent means 226 comprises a dumbbell-shaped plunger 228 slidably mounted in a radial recess 230 formed in the bearing block 212. The plunger 228 includes an upper hollow body portion 232 which receives a spring 233, and a lower nose portion 234 that is biased by the spring 233 into engagement with a bushing 236 mounted in the rear housing wall 156. A roll release lever 238 is pivotally mounted by means of a pin 240 in the bearing block 212. The pin 240 is formed with a transverse flattened portion 242 that is engageable with the underside of the upper body portion 232 of the plunger 228. A reaction pin 244 at one end is secured in the bearing block 212 and at the other end projects into an arcuate slot 246 formed in the release lever 238. Due to the lost motion connection provided by the pin 244 and slot 246, counterclockwise pivotal movement of the lever 238 initially causes the pin 240 to rotate causing the flattened portion 242 to raise the plunger 228 so as to withdraw the nose portion 234 from engagement with the bushing 236. Then, when the upper end edge of the slot 246 engages the reaction pin 244, subsequent counterclockwise pivotal movement of the lever 238 causes rotation of the bearing block 212 thereby swinging the adjacent end of the roller 161 arcuately away from the roller 160.

Detent and release means of similar construction and operation are incorporated with the bearing block 216, a roll release lever being indicated at 248. The roll release mechanisms are provided for clearing any material that becomes wedged between the rolls 160 and 161. Through appropriate pivotal movement of the levers 238 and 248, either or both ends of the release roll 161 are first moved away from the roll 160 and then returned to original position. During the cleaning operation, which may be carried out while the rolls 160 and 161 are either rotating or stopped, the axial setting of the roll 160 remains undisturbed and the detent means serve to realign the roll 161 in its original position so that the original roll spacing remains unaffected. In addition, the plunger 228 of the detent means associated with each bearing block 212 and 216 is so arranged that it will move radially inwardly should any foreign object pass between the rolls 160 and 161 thus acting as an automatic safety release. As the nose portion 234 of the plunger 228 is withdrawn from the bushing 236, the bearing blocks 212 or 216, or both, are permitted to rotate allowing the release roll 161 to move away from the adjusting roll 160. After the foreign object has passed between the rolls, the release roll 161 may be returned to its normal operating position by manipulation of the hand levers 238 and 248. As will be readily appreciated, the release roller 161 may be released either manually or automatically. Due to the provision of the spherical or universal mountings of the bearing blocks 212 and 216, one end or the other of the roller 161 may be moved away from the roller 160 without distortion of any of the parts. Cylindrical bearing blocks combined with self aligning bearings could be used to accomplish the same result. Because the rolls 160 and 161 are tapered or conical, a very exacting vernier adjustment of the roll spacing or separation can be obtained by moving the roll 160 axially. Furthermore, parallelism is maintained between the axes of the rolls 160 and 161 during axial adjustment of the former and regardless of the roll spacing, thus assuring uniform performance of the roller mill at all times. Mounted on the outer end of the stub shaft 208 of the release roll 161 is a sheave 250. Being tapered, the rollers 160 and 161, and their associated journal ends or stub shafts, may be cast integrally whereby to eliminate possible separation between rolls and shafts. For long roll life, the grooves 160a and 161a in the outer peripheries of the rollers 160 and 161 preferably are cast integrally to retain hard cast shearing edges along the boundaries of the grooves. Also, by casting the rollers, manufacturing costs are minimized. Various features of the roller mill assembly are claimed in the copending applications of Richard R. Neebel and Richard E. Doerfer, Ser. No. 406,428, filed Oct. 26, 1964, now Patent No. 3,363,848, and of Robert L. Glidden, Ser. No. 406,431, filed Oct. 26, 1964.

The rollers 160 and 161 are adapted to be driven from the horizontal impeller drive shaft 64 that is driven by the main drive shaft 42. More particularly, as shown diagrammatically in FIGURE 2, a series of endless belts 252 are trained over the impeller drive sheave 70, an idler sheave 254, an auger sheave 256 that has connection with the horizontal auger in the auger housing 34, and the roller sheaves 184 and 250. This drive train is enclosed within the cover 44 (FIGURE 1). In connection with this drive train, since the release roller 161 moves in an arcuate path whenever it is released or swung away from the roller 160, the corresponding path of the sheave 250 is such that the tension on the belts 252 does not significantly change during actuation of the release roller 161.

In the operation of the above-described apparatus, the drive shaft 42 is connected to a power take-off shaft and the impeller 86, rolls 160 and 161, and other related devices are thereby rotated. Then ears of corn, with or without shucks, are introduced into the lower end of the feeder auger housing 30 wherefrom they are conveyed upwardly to the hopper 28. From the hopper 28 the ears of corn drop by gravity into corn chopper assembly. As they fall onto the high impeller vane members 94, the ears of corn are fractured into pieces to assist subsequent fragmentation and moved centrifugally outwardly; gravity concurrently pulls the material downwardly. Due to the pyramidal shape of the impeller 86, decreasing clearance is provided between the impeller and the screen assembly or perforated enclosure means 112 whereby as the material moves downwardly it is wedged against the screen assembly 112 and moved into the area of the shearing bars 120. As the impeller cutter bars 98 and 102 pass the stationary shearing or cutter bars 120, the material being processed is sheared into fragments. Fragments which are small enough to pass through the screen perforations 116 are thrust therethrough by centrifugal force and the natural air flow of fanning action of the impeller 86. Fragments also pass through the perforations 56 in the plate 54. The size of the perforations 116 may of course be varied to meet desired sizing requirements. The concave pyramidal shape of the impeller 86 further provides a pulsing action during the processing operation to improve efficiency. Also, by reason of the polygonal configuration of the screen 112, the cutters 98 and 102 at the terminal ends of the impeller vanes are permitted not only to come close to the screen cutter bars 120 but also to come close to the screen wall sections 114 between adjacent screen cutters 120 whereby to force material through the screen thus increasing the discharge capacity over conventional round screen constructions. In this connection, the space provided adjacent the sides of the screen cutters 120 serves to accommodate the flow of material being fragmentized at the screen cutter bars 120 whereby to facilitate discharge of the fragments through the screen and thereby minimize power requirements.

Material fragments passing through the screen perforations 116 drop by gravity through the grain passageway areas 63 in the gear housing assembly 24 and are directed by the wall portions 154 and baffles 155 to the rollers 160 and 161 of the roller mill assembly. Although both tapered rolls 160 and 161 rotate at the same r.p.m., their mating surface speeds differ up to 30 percent. As a result, small particles or kernels that are smaller than the distance between the rolls are caused to be twisted and thereby fractured and are not permitted to pass directly through the rolls without processing as would be the case with cylindrical rolls. This difference in surface speed also adds a slight shearing action to the rolling process. Since it requires only one-half to three-fourths as much force to fracture by shear as by compression, the power requirements are reduced. The final product leaving the roller mill assembly is conveyed through the horizontal auger housing 34, vertical auger housing 36 and gravity discharge spout 38 to the point of discharge.

While we have shown and described what we believe to be a preferred embodiment of our present invention, it will be understood by those skilled in the art that various rearrangements and modifications may be made therein without departing from the spirit and scope of our invention.

We claim:

1. Apparatus for chopping material such as ears of corn, comprising a horizontal perforated supporting plate, impeller means adjacent the upper surface of said supporting plate and being rotatable about a vertical axis relative thereto, vertically disposed perforated wall means on said supporting plate and extending about the circumference of said impeller means, shearing means operatively associated with said impeller means, and said impeller means during rotation serving with said shearing means to break up material fed thereto into fragments whereupon the latter are thrust by centrifugal force through substantially the full circumferential extent of said perforated wall means.

2. Apparatus for chopping material such as ears of corn, comprising an impeller having a plurality of radial vanes rotatable about a vertical axis with at least one vanes having a portion projecting vertically above at least some of the other vanes, vertically disposed enclosure means extending about the circumference of said impeller and having perforations therein, shearing means circumferentially spaced about said enclosure means and arranged for cooperation with the outer ends of said vanes, said one vane portion upon rotation of said impeller serving to fracture material fed thereto into pieces, and said impeller serving to move the latter by centrifugal force toward said enclosure means where said pieces are sheared into fragments as the ends of said vanes pass said shearing means and then thrust by centrifugal force through said perforations in said enclosure means.

3. Apparatus for chopping material such as ears of corn, comprising an impeller having a plurality of radial vanes rotatable about a vertical axis, vertical cutter means at the outer ends of said vanes, at least one of said vanes having a portion projecting vertically above at least some of the other vanes, stationary vertically disposed perforated wall means extending about the circumference of said impeller, a plurality of stationary vertical cutter means arranged about said perforated wall means for cooperation with said cutter means at the outer ends of said vanes, said one vane portion upon rotation of said impeller serving to fracture material fed thereto into pieces, and said impeller serving to move the latter by centrifugal force toward said perforated wall means where said pieces are sheared into fragments as said cutter means at the ends of said vanes pass said stationary cutter means and then thrust by centrifugal force through substantially the full circumferential extent of said perforated wall means.

4. Apparatus for chopping material such as ears of corn, comprising a pyramidal impeller rotatable about a vertical axis, a horizontal perforated plate supported below said impeller, vertically disposed perforated screen means extending about the circumference of said impeller, shearing means operatively associated with said impeller, and said impeller during rotation serving with said shearing means to break up material fed thereto into fragments whereupon some of the latter pass through said perforated plate and some are thrust by centrifugal force through substantially the full circumferential extent of said perforated screen means.

5. Apparatus for chopping material such as ears of corn, comprising a pyramidal impeller having a plurality of radial vanes rotatable about a vertical axis with alternate vanes having portions projecting vertically above the other vanes, vertically disposed enclosure means extending about the circumference of said impeller and having perforations therein, shearing means circumferentially spaced about said enclosure means and arranged for cooperation with the outer ends of said vanes, said portions of said alternate vanes upon rotation of said impeller serving to fracture material fed thereto into pieces, and said impeller serving to move the latter by centrifugal force toward said enclosure means where said pieces are sheared into fragments as the ends of said vanes pass said shearing means and then thrust by centrifugal force through said perforations in substantially the full circumferential extent of said enclosure means.

6. Apparatus for chopping material such as ears of corn, comprising a pyramidal impeller having a plurality of radial vanes rotatable about a vertical axis, vertical cutter means at the ends of said vanes, alternate vanes having portions projecting vertically above the other vanes, stationary vertically disposed perforated wall means extending about the circumference of said impeller, a plurality of stationary vertical cutter means arranged about said perforated wall means for cooperation with said cutter means at the outer ends of said vanes, said portions of said alternate vanes upon rotation of said impeller serving to fracture material fed thereto into pieces, and said impeller serving to move the latter by centrifugal force toward said perforated wall means where said pieces are sheared into fragments as said cutter means at the ends of said vanes pass said stationary cutter means and then thrust by centrifugal force through said perforated wall means.

7. Apparatus for chopping material such as ears of corn, comprising multiple-vane rotatable impeller means, perforated screen means of polygonal configuration extending about the circumference of said impeller means, shearing means operatively associated with said impeller means, and said impeller means during rotation serving with said shearing means to break up material fed thereto into fragments whereupon the latter are thrust by centrifugal force through substantially the full circumferential extent of said perforated screen means.

8. Apparatus for chopping material such as ears of corn, comprising a pyramidal impeller having a plurality of radial vanes rotatable about a vertical axis, stationary perforated wall means of polygonal configuration extending about the circumference of said impeller, a plurality of stationary vertical cutter means arranged about said perforated wall means at each of the corners thereof for cooperation with the outer ends of said vanes, and said impeller upon rotation serving to fracture the material fed thereto into pieces and to move the latter by centrifugal force toward said perforated wall means where said pieces are sheared into fragments as the ends of said vanes pass said stationary cutter means and then thrust by centrifugal force through said perforated wall means.

9. Apparatus for chopping material such as ears of corn, comprising an impeller having a plurality of radial vanes rotatable about a vertical axis, vertical cutter means at the outer ends of said vanes, stationary vertically disposed perforated wall means of polygonal configuration extending about the circumference of said impeller, a plurality of stationary vertical cutter means arranged about said perforated wall means at each of the corners thereof for cooperation with said cutter means at the outer ends of said vanes, and said impeller upon rotation serving to fracture material fed thereto into pieces and to move the latter by centrifugal force toward said perforated wall means where said pieces are sheared into fragments as said cutter means at the ends of said vanes pass said stationary cutter means and then thrust by centrifugal force through substantially the full circumferential extent of said perforated wall means.

10. Apparatus for processing material such as ears of corn, comprising pyramidal impeller means rotatable about a vertical axis, a horizontal perforated plate supported below said impeller, vertically disposed perforated wall means extending about the circumference of said impeller means, shearing means operatively associated with said impeller means, said impeller means during rotation serving with said shearing means to break up material fed thereto into fragments whereupon some of the latter pass through said perforated plate and some are thrust by centrifugal force through substantially the full circumferential extent of said perforated wall means, and a roller mill arranged vertically below said impeller means, said perforated plate and said perforated wall means for receiving said fragments and further processing the same.

11. Apparatus for processing material such as ears of corn, comprising a pyramidal impeller having a plurality of radial vanes rotatable about a vertical axis, a horizontal perforated wall plate supported below said impeller, vertical cutter means at the outer ends of said vanes, stationary vertically disposed perforated wall means extending about the circumference of said impeller, a plurality of stationary vertical cutter means arranged about said perforated wall means for cooperation with said cutter means at the outer ends of said vanes, said impeller upon rotation serving to fracture material fed thereto into pieces and to move the latter by centrifugal force toward said perforated wall means where said pieces are sheared into fragments as said cutter means at the ends of said vanes pass said stationary cutter means, some of said fragments passing through said perforated plate and some being thrust by centrifugal force through substantially the full circumferential extent of said perforated wall means, and a roller mill arranged vertically below said impeller, said perforated plate and said perforated wall means for receiving said fragments and further processing the same.

References Cited

UNITED STATES PATENTS

| | | | |
|---|---|---|---|
| 655,805 | 8/1900 | Shellbarger | 241—73 X |
| 2,192,382 | 3/1940 | Koch | 241—73 |
| 3,217,765 | 11/1965 | Anderson | 241—152 X |

ANDREW R. JUHASZ, *Primary Examiner.*